Sept. 12, 1967  C. A. REYNOLDS  3,340,590
BALL BEARING SEPARATOR

Filed March 1, 1965  6 Sheets-Sheet 1

INVENTOR.
Curtiss A. Reynolds,
BY Parker & Carter
Attorneys.

Sept. 12, 1967 C. A. REYNOLDS 3,340,590
BALL BEARING SEPARATOR
Filed March 1, 1965 6 Sheets-Sheet 2
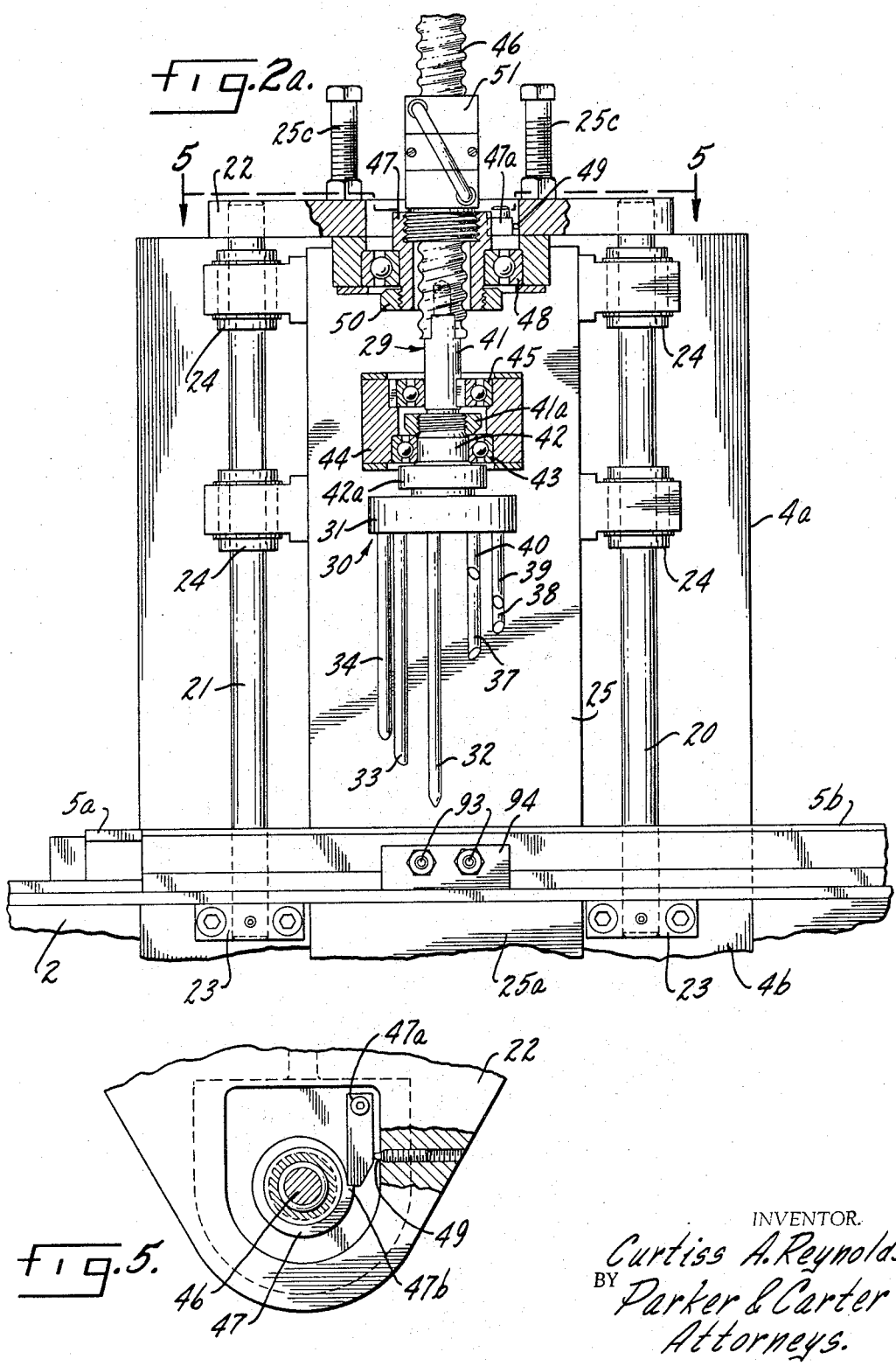
INVENTOR.
Curtiss A. Reynolds,
BY Parker & Carter
Attorneys.

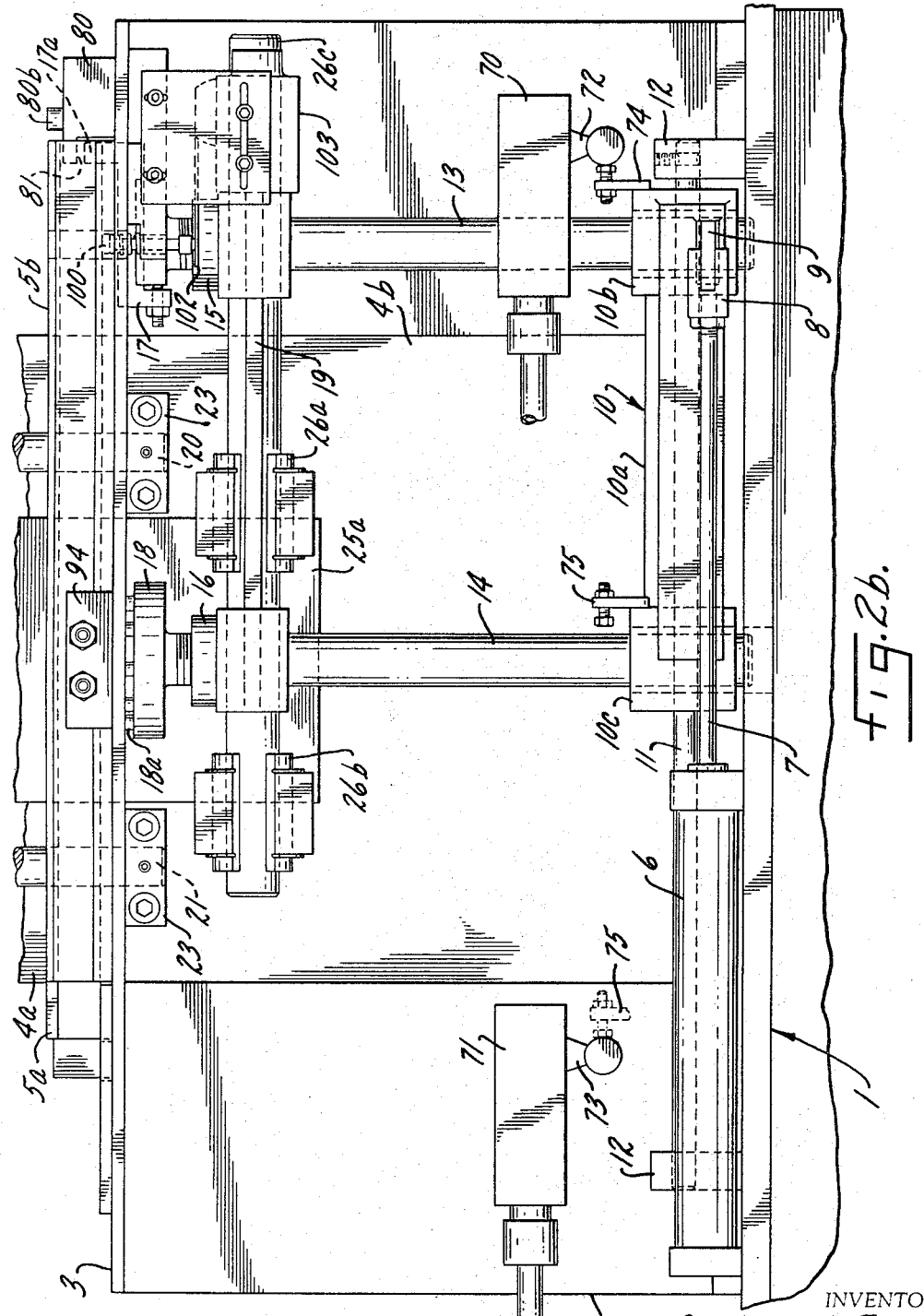

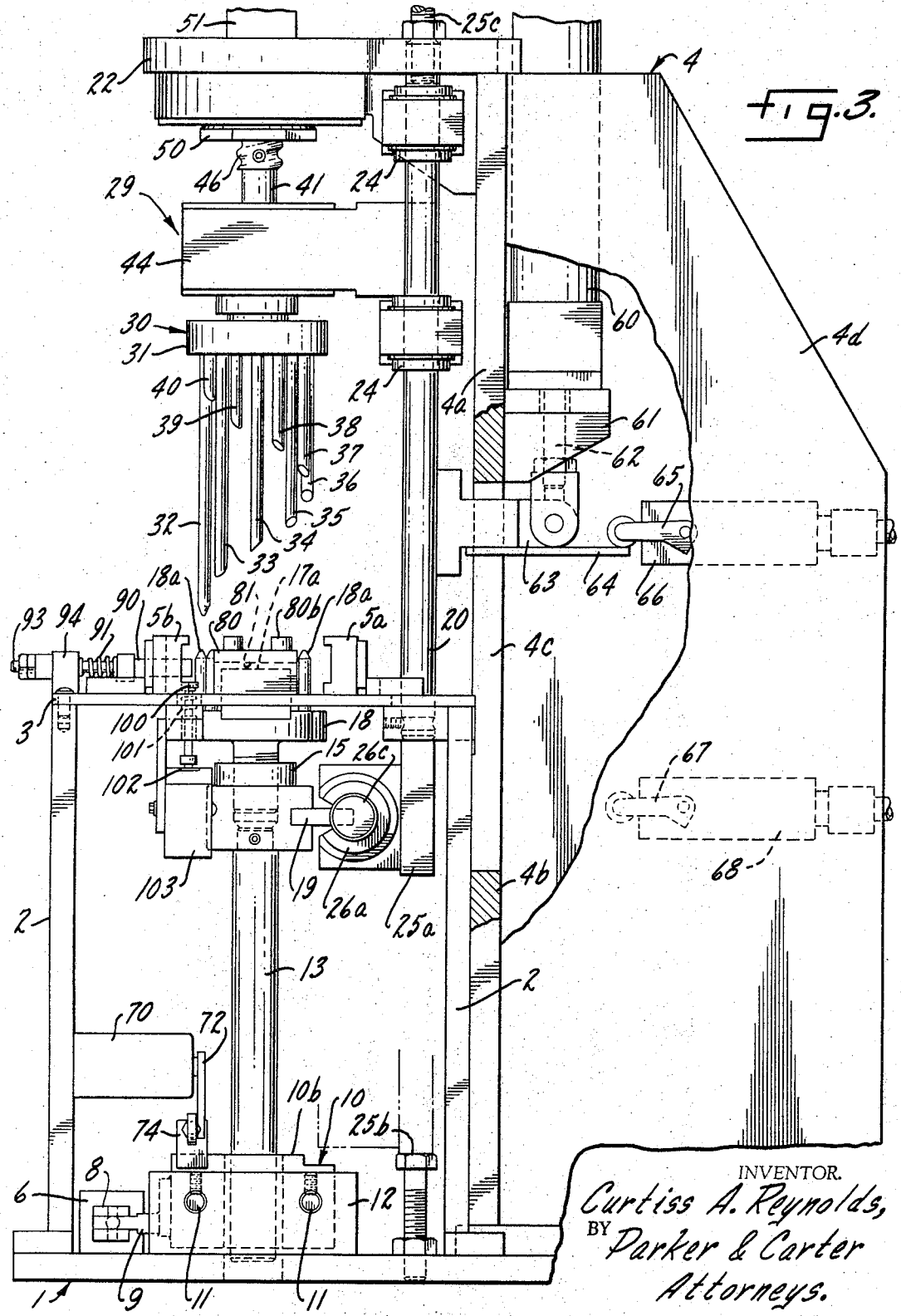

United States Patent Office

3,340,590
Patented Sept. 12, 1967

3,340,590
BALL BEARING SEPARATOR
Curtiss A. Reynolds, Rockford, Ill., assignor to Rehnberg-Jacobson Mfg. Co. Inc., Rockford, Ill., a corporation of Illinois
Filed Mar. 1, 1965, Ser. No. 436,026
16 Claims. (Cl. 29—201)

This invention relates to the manufacture of ball bearings and has particular relation to the automatic achievement of predetermined separation among the balls of a ball bearing in the course of its construction.

In the construction of ball bearings, a plurality of bearing balls are loosely positioned at random within the annular space between an inner and an outer ring or race. Attempts to automate the construction or assembly of ball bearings have foundered at the point of equispacing the bearing balls prior to positioning retainer rings thereon to maintain said spacing in the completed bearing. Attempts at automation have proved injurious to the finished product, slow and costly. Equispacing accomplished by hand subjects the assembly process to a resulting delay and human error. Accordingly, it is one purpose to provide means productive of such equispacing automatically, rapidly and repetitively.

Another purpose of the invention is to provide means for automatically separating balls in a ball bearing.

Another purpose is to provide means automatically productive of required spacing among balls in a ball bearing on a rapid, high production basis.

Another purpose is to provide means productive of equal spaces among balls presented at random between an inner and outer race of a ball bearing.

Another purpose is to provide a machine effective automatically to position a ball bearing at one stage of its construction, to separate balls at predetermined spacing within said bearing, and to reposition said bearing while maintaining said ball separation.

Another purpose is to provide means for separating bearing balls at minimum risk of damage to the balls.

Another purpose is to provide means for automatically spacing bearing balls effective to guarantee identical spacing therebetween on a continuous repetitive basis.

Another purpose is to provide a bearing ball separating device of maximum simplicity and economy in manufacture and use.

Other purposes will appear from time to time during the course of the specification and claims.

Figure 1:
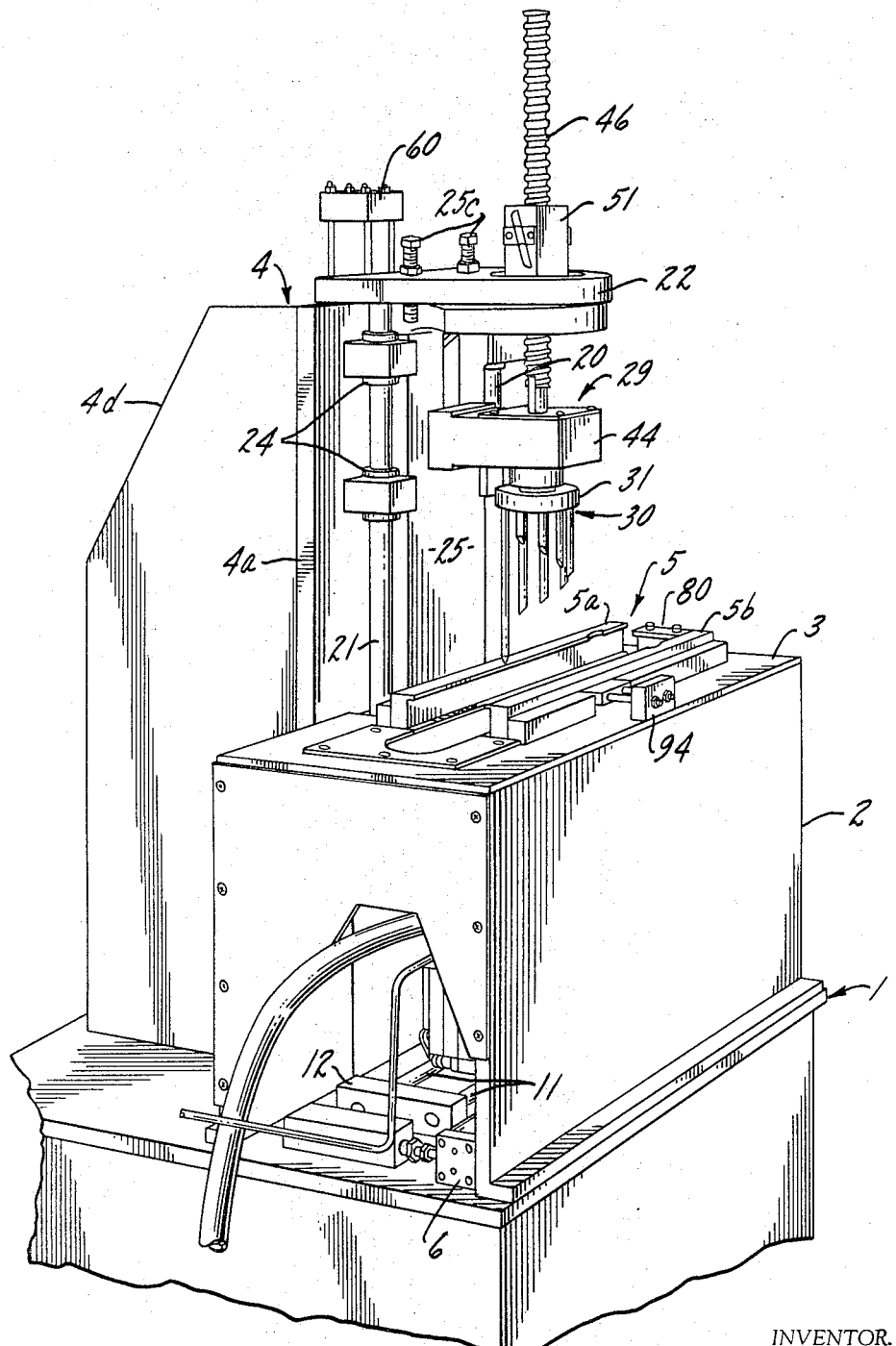
Figure 4:
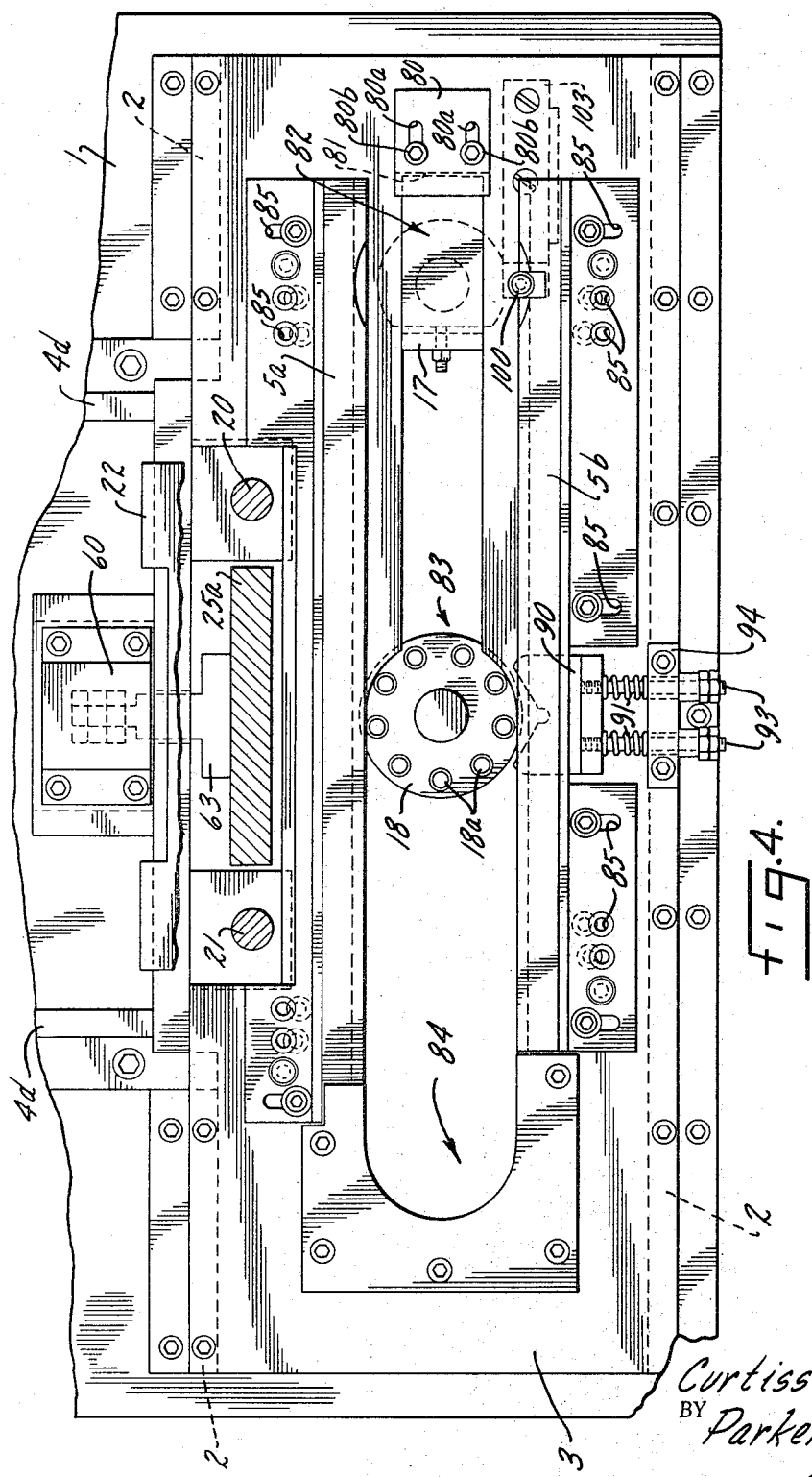
Figure 6:
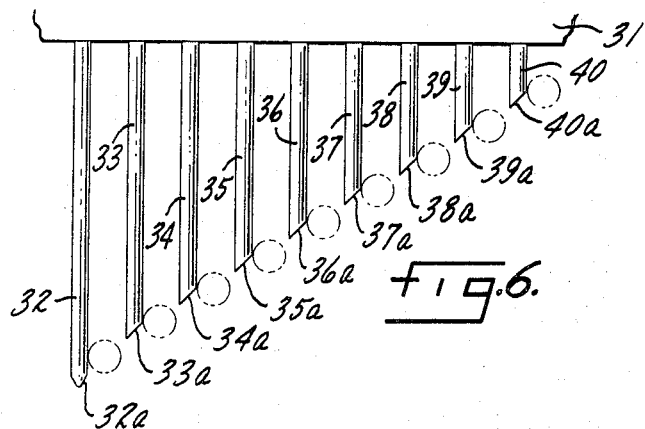
Figure 7A:
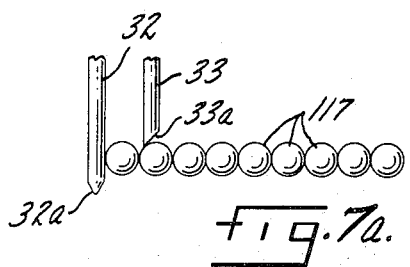
Figure 7B:
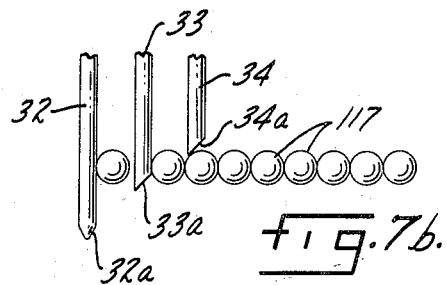
Figure 8:
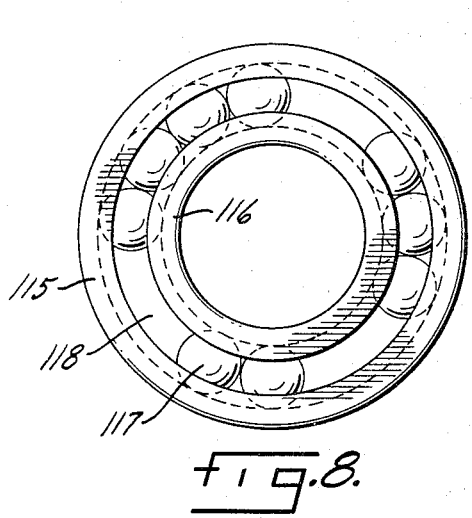
Figure 9:
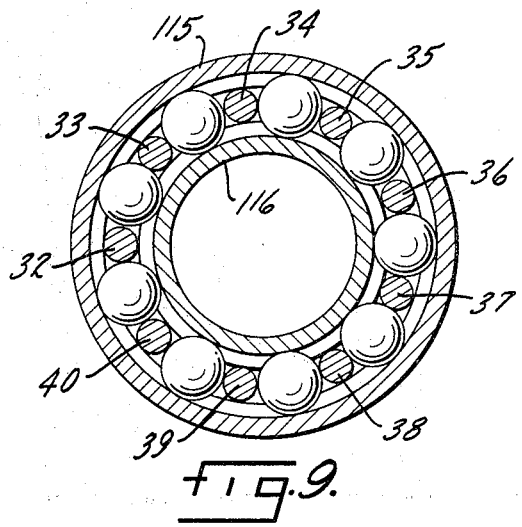

The invention is illustrated more or less diagrammatically in the accompanying drawings wherein:
 FIGURE 1 is a perspective view;
 FIGURE 2a is a front elevation, upper portion;
 FIGURE 2b is a front elevation, lower portion;
 FIGURE 3 is a side elevation;
 FIGURE 4 is a top plan view of a bearing track;
 FIGURE 5 is a detail view on the line 5—5 of FIGURE 2a;
 FIGURE 6 is a schematic view;
 FIGURE 7a is a schematic layout of a step in the operation of the invention;
 FIGURE 7b is a schematic layout of another step in the operation of the invention;
 FIGURE 8 is a top view of a bearing at one stage in the operation of the invention; and
 FIGURE 9 is a top view in partial cross section and illustrating a bearing at another stage in the operation of the invention.

Like parts are indicated by like numerals throughout the specification and drawings.

Referring now to the drawings, a base is indicated by the numeral 1. A frame 2 rises from and is supported on the base 1. A transfer table 3 extends horizontally across the frame 2. A superstructure 4 rises vertically above the table 3. A guide rail or bearing track assembly 5 extends along the upper surface of table 3.

Supported on the base 1 is a motor means, such as the pneumatic cylinder 6. The cylinder 6 has a rod 7 extending reciprocally therefrom, the rod 7 being connected as indicated at 8 to an arm 9 which is in turn secured to a transfer assembly 10. A base 10a of assembly 10 rides on spaced rails 11 which are in turn supported on the base 1 by brackets 12. The bearings 10b, 10c of assembly base 10a slidably receive vertical, spaced stanchions 13, 14. An area below base 1 is intended for reception of the lower portions of stanchions 13, 14. Carried at the upper ends of the stanchions 13, 14 are sleeves 15, 16, respectively. Upstanding on sleeve 15 is a transfer rack assembly 17. The transfer rack 17 includes an upstanding transfer finger portion 17a positionable between the guide rails 5. Upstanding on sleeve 16 is a ball positioner member 18. The positioner member 18 has a plurality of circumferentially spaced positioner fingers 18a movable into the area between rails 5. A strip or bar 19 is carried by and between sleeves 15, 16 and extends laterally from the plane of stanchions 13, 14.

The superstructure 4 includes a pair of spaced vertical rails 20, 21 and a support having an upper portion 4a and a lower portion 4b which lies in the area of frame 2. The rails 20, 21 are secured at their upper ends to a cross plate 22 and have their opposite ends extending through table 3 for attachment by fastener members such as those indicated at 23.

Slidable on and between the rails 20, 21, through the mediacy of ball bushings 24, is a vertically positioned plate 25. Upper and lower stop or limit abutments 25c and 25b adjustably establish the excursion of plate 25. The plate 25 extends below table 3, the lower portion 25a of plate 25 carrying a pair of spaced control members 26a, 26b which are slotted to receive a center line portion of the bar 19 slidably therewithin. A rod 26c has a slot receiving the outer segment of bar 19, as shown in dotted lines in FIGURE 3, and rod 26c slides within members 26a, 26b as assembly 10 reciprocates.

Carried on the plate 25 is a ball separator unit indicated generally by the numeral 29. The unit 29 includes a separator element 30 comprising a carrier 31 from which a plurality of equally, circumferentially spaced fingers 32–40 depend. A lock nut 41a secures a stub shaft 42 to a shaft 41. Stub shaft 42 is rotatable in bearing 43 which is in turn supported on plate 25 by bracket 44. A ball clutch 45 is supported on said bracket and engages with shaft 41. Separator element 30 is removably secured to stub shaft 42 as by the connection 42a. Shaft 41 is in turn secured to a control rod 46, the outer surface of which carries a thread-like conformation for purposes which will appear hereinbelow. A ratchet sleeve 47 is carried within a bearing 48 supported below plate 22. A pawl 47a is urged into engagement with sleeve 47 by yieldingly urged spring plunger 49, as may be more fully apparent from a view of FIGURE 5.

A lock nut 50 engages sleeve 47 below bearing 48. Member 46 extends upwardly through sleeve 47 and through a ball nut member 51. The ball nut member 51 is of well understood construction and is not, therefore, illustrated in detail, it being understood that sufficient ball members are carried therein for engagement between the ridges on member 46 to produce rotation of member 46 as the same is moved downwardly through the ball nut member 51 as discussed in greater detail hereinbelow.

As may be best seen in FIGURE 3, a vertically disposed motor means such as pneumatic cylinder 60 is supported, as by bracket 61, on superstructure 4. A rod 62 extending reciprocally from cylinder 60 is secured, as by arm 63, to plate 25. Arm 63 extends through the slot or opening 4c in superstructure 4. A switch actuating finger 64 is secured to arm 63 and extends a distance sufficient to contact switch arm 65 of a control switch 66. A switch arm 67 extends from a control switch 68 spacedly supported within a cabinet 4d, the arm 67 being positioned also for contact by actuating finger 64. It will be observed in FIGURE 2b that a similar set of actuating switches 70, 71 respectively carry switch arms 72, 73 in position to be contacted by switch actuating abutments or fingers 74, 75, respectively, as assembly 10 is moved between the end positions of its travel.

Referring now to FIGURE 4, it will be seen that an abutment 80 is positioned at one end of the table 3 and has an end surface at one end of track 5, said end surface having a recess 81 into which the transfer finger 17a of member 17 is extendable. Slots 80a and posts 80b permit adjustment of abutment 80. The guide rail or track assembly 5 includes a pair of spaced, parallel, opposed grooved or rail members 5a, 5b. Bearing positions or stations 82, 83, 84 are shown respectively, i.e. a loading station 82 adjacent the abutment 80, a ball-separating or positioning station 83 and an unloading station 84.

As indicated generally at 85, a plurality of locator apertures are formed on the track members 5a, 5b and on table 3 to provide for variation in the spacing between rails 5a, 5b and thus for reception of bearings having varying diameters. Similarly, rails 5a, 5b are of a height sufficient to receive bearings of varying thickness. Indicated at 90 is a retainer plate urged by springs 91 toward a bearing in the ball-separating station 83. Member 90 is carried by adjusting posts 93 about which springs 91 are positioned, the springs 91 being active against an abutment plate 94 through which posts 93 extend.

Referring now to FIGURE 3, it will be observed that a switch actuator pin 100 is carried at the loading station in general alignment with the lower portion of the track 5b. The pin 100 is urged upwardly by light spring 101. The distal end of pin 100 engages switch arm 102 of a microswitch shown generally at 103.

Referring now to FIGURE 6, it will be seen that the separating fingers 32–40 have been schematically presented in a single plane, it being understood that the fingers 32–40 are normally arranged in circumferentially spaced relationship adjacent the periphery of circular member 31. It will be seen that finger 32 is longer than the remaining fingers and that finger 32 has a conical distal end surface 32a. The remaining fingers 33–40 each has a chamfered end surface, said surfaces being indicated at 33a–40a inclusive. The surfaces 33a–40a are inclined in the same direction and angle and the low points thereof lie in a single inclined plane. Thus the fingers of each adjacent pair of fingers 33–40 vary in length an equal amount to each other adjacent pair, whereas finger 32 varies in length from finger 33 a distance greater than the variance in length between any two adjacent fingers 33–40. The fingers 32–40 are preferably cylindrical and are conveniently formed of the material trademarked "Teflon," it being found effective to provide a cylindrical finger of metal covered with a cylindrical sleeve of "Teflon." As will be seen in the dotted-line illustration of a bearing ball in FIGURE 6, the fingers 32–40 are spaced apart a distance only very slightly greater than the diameter of the balls to be separated. While the fingers 32–40 are shown as nine in number, it will be understood also that the separator fingers of the invention will vary in number in accordance with the number of balls to be separated. Similarly, the cross-sectional shape of fingers 32–40 may vary in relation to the number of balls within a particular-size ball bearing race. If, for example, a relatively few number of balls are employed in the larger space between a pair of substantially large inner and outer ball bearing races, the fingers 32–40 may take a wider configuration to insure substantial occupation of the desired space between adjacent balls in such bearing. In such case, however, the extended or longest finger, such as the finger 32, will have a conical end surface similar to surfaces 32a and the remaining fingers will have chamfered end surfaces similar to surfaces 33a–40a.

FIGURES 7a, 7b illustrate schematically the ball-separating action of the invention. FIGURE 8 illustrates a bearing assembly including an outer race 115, an inner race 116 and a plurality of bearing balls 117 randomly positioned in the annular space 118 between races 115, 116. FIGURE 9 illustrates the assembly 115–118 at a stage in the operation of the device wherein the fingers 32–40 have all penetrated space 118 and have produced the desired separation of balls 117 therein.

Whereas there has been shown and described an operative form of the invention, it should be understood that this showning and description are to be taken in an illustrative or diagrammatic sense only. There are many modifications in and to the invention which will be apparent to those skilled in the art and which will fall within the scope and spirit of the invention. For example, the references herein to horizontal and vertical relate to the parts as shown. Similarly, the movement of elements may be achieved by a variety of power means and linkages and the number of fingers 32–40, posts 18a and balls 117 may vary without departing from the nature and scope of the invention.

The use and operation of the invention are as follows:

The operator places an assembly, such as that shown in FIGURE 8, comprising an outer race 115 and an inner race 116 between which a number of bearing balls 117 are randomly positioned and free to roll about the area between races 115, 116, at the loading station 82 and against the abutment 80. A ball bearing assembly 115, 116, 117 at the loading station 82 will actuate switch pin 100 and switch 103. Shaft 7 is drawn into cylinder 6 to move the transfer assembly 10 in a path beneath table 3, or to the left as the parts are shown in FIGURE 2b. It will be understood that plate 25 is at this point in its uppermost position as shown in FIGURE 2 and hence bar 19 and rod 26c will slide in members 26a, 26b and transfer finger 17a of member 17 is in position beneath the overhang of recess 81 in abutment 80 and the bearing placed in loading station 82 will be moved along track 5 by member 17 into the separator position 83 intermediate the ends of track 5. The member 18, in its upper position illustrated in FIGURE 2b, will move with the transfer assembly 10. The bar 19 will slide into the slot of member 26b and member 18 will be positioned at the removal station 84 at the distal end of track 5 when member 17 has reached the separator position 83 intermediate the ends of track 5. When the assembly 10 has been retracted a major segment of its rearward travel (or to the left as the parts are shown), the contact 75 engages switch arm 73 of member 71 to initiate, through appropriate circuitry (not shown), actuation of power means 60 to cause outward or downward movement of rod 62 and hence of plate 25.

As plate 25 moves downwardly, member 46 is drawn through ball nut unit 51 and caused thereby to rotate, thus rotating member 31 and separator fingers 32–40. Elongated finger 32 enters the bearing positioned at the separator station 83. The conical end surface 32a of member 32 is effective to insure entry of member 32 between any two of the bearing balls 117 which may be in contact with each other. If the point of surface 32a should contact the center of a ball 17, said surface will nonetheless, as finger 32 rotates through annular space 118, move between that ball and an adjacent ball 117.

The increased length of member 32 is further effective to permit rotation of member 32 through the annular space or area 118 a distance sufficient to acquire or entrain a plurality of the balls 117 ahead of the member 32 prior to entry into space 118 by finger 33. FIGURES 7a, 7b, for example, illustrates the action of the fingers 32–40 in producing accurate predetermined spacing among the balls 117, the rotation of member 31 and fingers 32–40 being conveniently illustrated in a single plane. With a plurality of the balls 117 thus brought into contact with each other by finger 32, the finger 33 enters between the ball 117 engaged by finger 32 and the next adjacent ball 117, it being understood that the downward movement of fingers 32–40 is a continuing, uninterrupted, even movement and that the rotation of fingers 32–40 about the axis of member 31 is equally even and uninterrupted and that both the downward and rotating movements of the fingers 32–40 are simultaneous and coterminous. The entrainment or engagement of a plurality of balls by and ahead of member 32 insures against the entry of any two adjacent fingers 32–40 between any two balls 117. The chamfered surface 33a is inclined upwardly and forwardly of the direction of rotation of the finger 33, thus urging the train of balls beyond that engaged by finger 32 into a forward movement. As will be seen in FIGURE 7b, the finger 33 thus creates its own forward train of balls 117 in contact with each other and finger 34 is drawn between the ball 117 ahead of finger 33 and the next adjacent ball in the manner aforedescribed. As the fingers 34–40 continue to move downwardly and rotationally through the balls 117, it will be clear that the action described is repeated. When the last finger 40 has passed through the area 118, it will be seen in FIGURE 9 that substantially the entire area 118 between races 115, 116 has become occupied by alternating balls 117 and fingers 32–40.

When fingers 32–40 have thus all penetrated area 118, the member 64 is brought into contact with switch arm 67 of member 68 to initiate actuation of member 6 and thus to move shaft 7 and assembly 10 back toward the position illustrated in FIGURE 2b. It will be understood that the downward movement of plate 25, through means 26a, 26b, 26c and bar 19, causes members 15, 17 and 16, 18 to move downwardly with posts 13, 14. Thus the return action of assembly 10 is produced with transfer fingers 17a and positioner posts 18a withdrawn below the track 5.

When the transfer assembly 10 has been returned to its forward position, as illustrated in FIGURE 1, contact 74 engages switch arm 72 of member 70 to actuate means 60 and thus to return shaft 62 thereinto to move plate 25 upwardly, or toward the position illustrated in FIGURES 1, 2 and 3. Fingers 32–40 are withdrawn from among the balls 117 with ratchet means 47a in engagement with locking sleeve 47 to prevent rotation of fingers 32–40 as they are withdrawn from among the balls 117. As plate 25 rises and fingers 32–40 are withdrawn, members 13, 14, 17 and 18 are simultaneously drawn upwardly by members 26a, 26b, 26c toward track 5 to position transfer finger 17a within recess 81 and positioner posts 18a are drawn into position between the balls 117 in the bearing at the separator station 83. It will be understood that the ratchet 47a engages a tooth 47b of sleeve 47, as shown in FIGURE 6, to lock the fingers 32–40 in a predetermined position between races 115, 116 and that said predetermined position corresponds to the fixed position of positioner posts 18a which are equal in number to fingers 32–40. Thus posts 18a are substituted for fingers 32–40, as shown in cross section in FIGURE 9, for example.

As shaft 62 reaches its withdrawn position, as shown in FIGURE 3, the contact arm 61 engages switch arm 65 of member 66 to actuate power means 6 and thus to withdraw shaft 7, the operation above described being thus repeated. In this instance, however, the operator will have placed another bearing in the receiver or loading station 82 against abutment 80 and the retraction of shaft 7 produces movement of the first-described bearing, with the positioner posts 18a between the balls therein, into the removal station at the distal end of track 5 and finger 17a will move a new bearing, with balls 117 at random between races 115, 116, into the separator position 83. The operator then places a retainer, such as a standard female retainer ring (not shown), onto the balls in the race positioned at the removal station and manually lifts the bearing, the balls being held in position by said retainer, out of track 5. Thereafter the action is fully automatic, the operator merely placing a new bearing having balls 117 therein at random in the receiver station 82 at one end of track 5 and removing a bearing, with positioned balls held by a retainer ring, from the removal station 84 at the opposite end of track 5.

What is claimed is:

1. Means for automatically treating a bearing assembly which includes an inner and outer race and a plurality of bearing balls at loose random between said races, said means including a track having a receiver station, a separator station and a removal station, a transfer assembly adjacent said track, a separator assembly adjacent said track and automatic means for alternately moving said transfer assembly along said track to transfer bearing assemblies therealong and moving said separator assembly across said track to separate said balls into equally spaced circumferential relationship between said races, a sliding connection between said transfer and separator assemblies, ball positioner means carried by said transfer assembly, said connection being effective to cause movement of said positioner means across said track in response to movement of said separator assembly.

2. Means for automatically treating a bearing assembly which includes an inner and outer race and a plurality of bearing balls at loose random between said races, said means including a track having a receiver station, a separator station and a removal station, a transfer assembly adjacent said track, a separator assembly adjacent said track and automatic means for alternately moving said transfer assembly along said track to transfer bearing assemblies therealong and moving said separator assembly across said track to separate said balls into equally spaced circumferential relationship between said races and a sliding connection between said transfer and separator assemblies.

3. In combination, a base, a bearing track on said base, a transfer assembly movable on said base, a ball separator assembly movable on said base, a sliding connection between said transfer and separator assemblies, and power means on said base operatively connected to said transfer and separator assemblies to move the same relative to said track, each of said assemblies being movable in response to completion of travel by the other of said assemblies.

4. In combination, a base, a bearing track on said base, a transfer assembly movable on said base, a ball separator assembly movable on said base, and power means on said base operatively connected to said transfer and separator assemblies to move the same relative to said track, said separator assembly including a plurality of circumferentially spaced fingers and means for rotating said fingers while said separator assembly is moved in one direction by said power means.

5. In combination, a base, a bearing track on said base, a transfer assembly movable on said base, a ball separator assembly movable on said base, and power means on said base operatively connected to said transfer and separator assemblies to move the same relative to said track, said separator assembly including a plurality of circumferentially spaced fingers and means for rotating said fingers while said separator assembly is moved in one direction by said power means, and means for holding said fingers against rotation while said separator assembly is moved in the opposite direction by said power means.

6. In combination, a base, a bearing track on said base, a transfer assembly movable on said base, a ball separator assembly movable on said base, and power means on said base operatively connected to said transfer and separator assemblies to move the same relative to said track, said transfer assembly including a plurality of circumferentially spaced positioner posts and an operating connection between said separator and transfer assemblies effective to move said posts into and out of said track in response to movement of said separator assembly.

7. In combination, a base, a bearing track on said base, said track including a loading station, a ball separator station and a removal station spaced thereon, a transfer assembly on said base and means for reciprocating said transfer assembly along said track, a transfer finger on said assembly movable into said track to contact a bearing at said loading station and to move said bearing to said separator station in response to movement of said transfer assembly in one direction, a plurality of circumferentially spaced positioner posts on said transfer assembly movable into said track to extend alternately between a plurality of bearing balls circumferentially spaced in a bearing at said separator station and to move said last-named bearing to said removal station while maintaining said balls in said spaced relationship in response to said movement of said transfer assembly.

8. In combination, a base, a bearing track on said base, said track including a loading station, a ball separator station and a removal station spaced thereon, a transfer assembly on said base and means for reciprocating said transfer assembly along said track, a transfer finger on said assembly movable into said track to contact a bearing at said loading station and to move said bearing to said separator station in response to movement of said transfer assembly in one direction, a plurality of circumferentially spaced positioner posts on said transfer assembly movable into said track to extend alternately between a plurality of bearing balls circumferentially spaced in a bearing at said separator station and to move said last-named bearing to said removal station while maintaining said balls in said spaced relationship in response to said movement of said transfer assembly, and a separator assembly on said base and means for reciprocating said separator assembly at said separator station.

9. In combination, a base, a bearing track on said base, said track including a loading station, a ball separator station and a removal station spaced thereon, a transfer assembly on said base and means for reciprocating said transfer assembly along said track, a transfer finger on said assembly movable into said track to contact a bearing at said loading station and to move said bearing to said separator station in response to movement of said transfer assembly in one direction, a plurality of circumferentially spaced positioner posts on said transfer assembly movable into said track to extend alternately between a plurality of bearing balls circumferentially spaced in a bearing at said separator station and to move said last-named bearing to said removal station while maintaining said balls in said spaced relationship in response to said movement of said transfer assembly, a separator assembly on said base and means for reciprocating said separator assembly at said separator station, and an operating connection between said separator assembly and said transfer finger and positioner posts effective to move said finger and posts into and out of said track in response to reciprocation of said separator assembly.

10. In combination, a base, a bearing track on said base, said track including a loading station, a ball separator station and a removal station spaced thereon, a transfer assembly on said base and means for reciprocating said transfer assembly along said track, a transfer finger on said assembly movable into said track to contact a bearing at said loading station and to move said bearing to said separator station in response to movement of said transfer assembly in one direction, a plurality of circumferentially spaced positioner posts on said transfer assembly movable into said track to extend alternately between a plurality of bearing balls circumferentially spaced in a bearing at said separator station and to move said last-named bearing to said removal station while maintaining said balls in said spaced relationship in response to said movement of said transfer assembly, and a separator assembly on said base and means for reciprocating said separator assembly at said separator station, said separator assembly including a plurality of circumferentially spaced separator fingers of varying lengths, said separator fingers being movable into said separator station, and means for rotating said separator fingers as the same move into said separator station.

11. In combination, a base, a bearing track on said base, a transfer assembly and means for reciprocating it on said base along said track to move bearings thereon, a separator member and means for reciprocating it on said base into and out of said track to separate balls in a bearing on said track, means for rotating said separator member as it is moved into said track and means preventing rotation of said separator member as it is moved out of said track.

12. A separating and positioning assembly for random balls in a bearing race including a plurality of circumferentially spaced parallel fingers, means for reciprocating said fingers in a straight path in one direction toward and into a race and in the opposite direction out of and away from a race, means responsive to movement of said fingers in said one direction to rotate said fingers and means responsive to movement of said fingers in said opposite direction to retain said fingers against rotation, one of said fingers having a conical end surface, the remainder of said fingers decreasing in length in the direction of rotation of said fingers.

13. The structure of claim 12, wherein each of the remainder of said fingers has a chamfered end surface upwardly inclined in the direction of rotation of said fingers.

14. The structure of claim 12 wherein said one finger is of sufficiently greater length than any of the remainder of said fingers to insure entry into and rotation within said race of said one finger prior to entry into said race of any of the remainder of said fingers as said fingers are moved in said one direction.

15. The structure of claim 12 wherein said fingers are spaced apart a distance greater than the diameter of the balls to be separated and positioned and less than twice said diameter.

16. The structure of claim 12 wherein the chamfered end surfaces of the remainder of said fingers lie in a single plane.

References Cited
UNITED STATES PATENTS

| | | | |
|---|---|---|---|
| 2,931,095 | 4/1960 | Esken | 29—201 |
| 3,079,678 | 3/1963 | Aller et al. | 29—201 |
| 3,135,041 | 6/1964 | Knobel | 29—201 |
| 3,148,437 | 9/1964 | Busch | 29—201 X |

JOHN F. CAMPBELL, *Primary Examiner.*

THOMAS H. EAGER, *Examiner.*